US012184524B2

(12) United States Patent
Ikeo

(10) Patent No.: US 12,184,524 B2
(45) Date of Patent: Dec. 31, 2024

(54) MANAGEMENT DEVICE, MANAGEMENT METHOD AND RECORDING MEDIUM

(71) Applicant: OMRON Corporation, Kyoto (JP)

(72) Inventor: Yuji Ikeo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 376 days.

(21) Appl. No.: 17/440,193

(22) PCT Filed: Feb. 27, 2020

(86) PCT No.: PCT/JP2020/008053
§ 371 (c)(1),
(2) Date: Sep. 17, 2021

(87) PCT Pub. No.: WO2020/195516
PCT Pub. Date: Oct. 1, 2020

(65) Prior Publication Data
US 2022/0166697 A1 May 26, 2022

(30) Foreign Application Priority Data
Mar. 26, 2019 (JP) .................................. 2019-058941

(51) Int. Cl.
*H04L 43/0864* (2022.01)
*H04L 7/02* (2006.01)
(Continued)

(52) U.S. Cl.
CPC ............ *H04L 43/0852* (2013.01); *H04L 7/02* (2013.01); *H04L 47/70* (2013.01)

(58) Field of Classification Search
None
See application file for complete search history.

(56) References Cited

U.S. PATENT DOCUMENTS 6,076,114 A * 6/2000 Wesley ................. H04L 47/193
714/748
9,979,665 B2 * 5/2018 Han ........................ H04L 43/16
(Continued)

FOREIGN PATENT DOCUMENTS

| CN | 103155488 | 6/2013 |
| EP | 3076251 | 10/2016 |

(Continued)

OTHER PUBLICATIONS

"Search Report of Europe Counterpart Application", issued on Nov. 23, 2022, p. 1-p. 9.

(Continued)

*Primary Examiner* — Bob A Phunkulh
(74) *Attorney, Agent, or Firm* — JCIPRNET

(57) ABSTRACT

Provided is a management device or the like that can flexibly set a task cycle of a master device. The management device is a management device that manages a network including a master device and a slave device connected to the master device, and comprises: a transmission delay time prediction unit which predicts a transmission delay time on the basis of network configuration information and node information; a transmission delay time measurement unit which measures the transmission delay time in the network; and a transmission delay time setting unit which presents to the user, a predicted value predicted by the transmission delay time prediction unit and a measured value measured by the transmission delay time measurement unit, and sets a cycle setting transmission delay time for setting a task cycle in which the master device transmits a signal to the slave device, according to the selection operation of the user.

4 Claims, 8 Drawing Sheets

(51) Int. Cl.
    *H04L 43/0852*     (2022.01)
    *H04L 47/70*     (2022.01)

(56) References Cited

U.S. PATENT DOCUMENTS

| | | | |
|---|---|---|---|
| 11,044,350 B1* | 6/2021 | Duke | H04L 47/193 |
| 2002/0110155 A1 | 8/2002 | Pearce et al. | |
| 2009/0046586 A1 | 2/2009 | Stuart et al. | |
| 2016/0065435 A1 | 3/2016 | Ito et al. | |
| 2017/0280342 A1* | 9/2017 | Sugiyama | H04W 24/08 |
| 2018/0132110 A1* | 5/2018 | Furuichi | H04L 43/0894 |
| 2018/0295599 A1* | 10/2018 | Bitra | G01S 5/021 |
| 2019/0173763 A1* | 6/2019 | Zhang | H04W 24/08 |
| 2019/0306066 A1* | 10/2019 | Wigren | H04L 43/0864 |
| 2020/0052974 A1* | 2/2020 | Yasuda | H04L 47/283 |
| 2023/0339113 A1* | 10/2023 | Kawakami | G05B 19/4103 |

FOREIGN PATENT DOCUMENTS

| | | |
|---|---|---|
| JP | 2011211673 | 10/2011 |
| JP | 2014120884 | 6/2014 |
| JP | 6094196 | 3/2017 |

OTHER PUBLICATIONS

"International Search Report (Form PCT/ISA/210) of PCT/JP2020/008053," mailed on Jun. 9, 2020, with English translation thereof, pp. 1-4.

"Written Opinion of the International Searching Authority (Form PCT/ISA/237) of PCT/ JP2020/008053," mailed on Jun. 9, 2020, with English translation thereof, pp. 1-6.

"Office Action of China Counterpart Application" with English translation thereof, issued on Jul. 5, 2022, p. 1-p. 13.

* cited by examiner

MANAGEMENT DEVICE, MANAGEMENT METHOD AND RECORDING MEDIUM

CROSS-REFERENCE TO RELATED APPLICATION

This application is a 371 application of the International PCT application serial no. PCT/JP2020/008053, filed on Feb. 27, 2020, which claims the priority benefits of Japan Patent Application No. 2019-058941, filed on Mar. 26, 2019. The entirety of each of the above-mentioned patent applications is hereby incorporated by reference herein and made a part of this specification.

TECHNICAL FIELD

The present invention relates to a management device that manages a network including nodes such as a master device and a slave device, a management method, and a computer-readable recording medium having a management program.

BACKGROUND ART

In factory automation (FA), production facilities installed in a factory are controlled by an industrial network constituted by nodes such as various slave devices that perform data collecting and control of the production facilities and a master device that perform overall management of the plurality of slave devices.

FIG. 8 is a block diagram showing a schematic configuration of a general industrial network 100. The industrial network 100 includes a master device 1 and slave devices 2-1 to 2-3 connected to the master device 1. The master device 1 and the slave device 2-1 are connected to each other by a cable 4 which is suitable for EtherCAT communication, and the slave devices 2-1 to 2-3 are also connected to each other by cables 4 that are suitable for EtherCAT communication. The slave devices 2-1 to 2-3 are connected to H/W devices which are production facilities in a wired or wireless manner and control the H/W devices in response to instructions received from the master device 1. Meanwhile, hereinafter, the slave devices 2-1 to 2-3 may be collectively simply referred to as slave devices 2.

In such an industrial network 100, for example, in a case where certain control is performed on the same H/W devices, it is preferable that state values be acquired from the H/W devices at the same timing (synchronization be achieved). On the other hand, a transmission delay occurs between the master device 1 and the slave device 2-1, between the slave devices 2-1 to 2-3, and in the master device 1 and the slave devices 2-1 to 2-3, and thus it is necessary to consider a transmission delay time to achieve synchronization between the plurality of slave devices 2.

On the other hand, for example, in Patent Literature 1, a technique for achieving synchronization between a plurality of slave devices on the basis of a transmission delay time calculated from node information (profile) indicating specific parameters of the slave devices and configuration information of a network is disclosed.

FIG. 9 is a diagram schematically showing processing achieving synchronization between the slave devices 2 of the industrial network 100 shown in FIG. 8 using the related art disclosed in Patent Literature 1. A flow from when an instruction for outputting a state value of an H/W device is given from the master device 1 to the slave device 2 to when a response is returned to the master device 1 is as follows.

(1) [Application execution] A data frame including an output instruction for a state value of the H/W device to the slave devices 2-1 to 2-3 is generated from a control unit 11 started up by an application of the master device 1.

(2) [Network transmission] Output instruction data is distributed from the master device 1 to the slave devices 2-1 to 2-3 through a network. Specifically, a data frame generated by the control unit 11 is subjected to transmission reception buffering in a communication unit 12 of the master device 1 and is then sequentially transferred to the slave devices 2-1 to 2-3 through the cables 4. The slave devices 2-1 to 2-3 receive an output instruction, add a state value (response), which is acquired from the H/W device and latched on the basis of an output instruction received in a former task cycle, to the data frame, and return the data frame having the state value added thereto to the master device 1. That is, the state value is not a state value for the output instruction generated in (1).

(3) [Output reception/arithmetic operation] The slave devices 2-1 to 2-3 convert an output instruction from telegram data into a receivable format and perform arithmetic operations on parameters necessary for output execution.

(4) [Output execution] The slave devices 2-1 to 2-3 execute outputting to the H/W device.

(5) [Input latch] The slave devices 2-1 to 2-3 acquire and latch the present state value of the H/W device and perform arithmetic operation/conversion into a format that can be analyzed by the master device 1.

(6) [Application execution] This is a process similar to (1). The control unit 11 of the master device 1 receives the state value returned in (2) and generates a data frame including an output instruction for the state value. Meanwhile, the received state value is not a state value for the output instruction generated in (1) as described above.

(7) [Network transmission] This is a process similar to (2). The slave devices 2-1 to 2-3 add the state value latched in (5) to the data frame transmitted from the master device 1 and return the data frame having the state value added thereto to the master device 1. The state value is input to the master device 1 at the time of executing an application next time.

As described above, in the industrial network 100, the processes of (2) to (6) are repeated at predetermined cycles.

As shown in (a) of FIG. 10, the output instruction generated in the process of (1) is received by the slave devices 2 in (2), and the slave device 2 executes the processes of (3) to (5) in response to the output instruction and adds a response (state value) f the output instruction to a data frame in the next (7). As a result, the control unit 11 of the master device 1 receives a response in the next application execution process (11). Here, a period of time required for the process of (2) is equivalent to a transmission delay time Td. In addition, a period of time from the completion of the process of (1) to the completion of the process of (4) is equivalent to a period of time required until each of the slave devices 2 responds (starts operating) to the output instruction (reaction time Tr) which is seen from the control unit 11. In addition, a period of tithe from the completion of the process of (1) to the start of the process of (11) is equivalent to a period of time required until the response to the output instruction (response time Ta) which is seen from the control unit 11.

CITATION LIST

Patent Literature

Patent Literature 1

Japanese Patent No. 6094196

SUMMARY OF INVENTION

Technical Problem

In Patent Literature 1, a transmission delay time is calculated (predicted) from a profile indicating specific parameters of slave devices and configuration information of a network. However, in the actual network, in a case where a distance between the slave devices is long, a light converter or a long optical cable exceeding 100 m may be used, Further, in a case where the slave device is a moving object, optical transmission may be performed. In this case, the actual transmission delay time becomes longer than a predicted value of the transmission delay time, which leads to a concern that the slave device may not operate as expected.

Specifically, as shown in (b) of FIG. 10, in a case where an actual transmission delay time Td' is longer than the predicted transmission delay time Td shown in (a) of FIG. 10, a reaction tuning for an output instruction of the slave device 2 deviates, and a reaction tune Tr is also increased. As a result, when an output (response) of a state value latched in (5) is not in time for network transmission of (7), the state value s added to a data frame of network transmission (12) in the next third cycle and is input to the master device 1 in (15). That is, as compared with (a) of FIG. 10, the response time Ta is extended from application execution (11) in a second cycle to application execution (15) in a third cycle, and thus a timing at which the master device 1 obtains a response to an output instruction is delayed by one cycle as indicated by a black bidirectional arrow. Thus, there is a concern that the slave device 2 may not operate as expected.

The present invention is contrived to solve the above-described problems, and an objective thereof is to provide a management device that can flexibly set a task cycle of a master device.

Solution to Problem

In order to solve the above-described problems, a management device according to the present invention is a management device that manages a network including a master device and slave devices connected to the master device, the management device including a transmission delay time prediction unit that predicts a transmission delay time from when the master device starts transmitting data to when data returns to the master device via all of the slave devices, on the basis of configuration information of the network and node information indicating specific parameters of the master device and the slave devices, a transmission delay time measurement unit that measures the transmission delay time in the network, and a transmission delay time setting unit that presents a predicted value predicted by the transmission delay time prediction unit and a measured value obtained by the transmission delay time measurement unit to a user to set a transmission delay time for cycle setting for setting a task cycle at which the master device transmits a signal to the slave device in response to the user's selection operation.

Further, in the above-described management device, the transmission delay time setting unit may set any one of the predicted value and the measured value as the transmission delay time for cycle setting.

In addition, the above-described management device may further c de a cycle setting unit that sets the task cycle on the basis of the transmission delay time for cycle setting.

A management method according to the present invention is a management method for managing a network including a master device and slave devices connected to the master device, the management method including a transmission delay time prediction step of predicting a transmission delay time from when the master device starts transmitting data to when the data returns to the master device via all of the slave devices, on the basis of configuration information of the network and node information indicating specific parameters of the master device and the slave devices, a transmission delay time measurement step of measuring the transmission delay time in the network, and a transmission delay time setting step of presenting a predicted value obtained in the transmission delay time prediction step and a measured value obtained in the transmission delay time measurement step to a user to set a transmission delay time for cycle setting for setting a task cycle at which the master device transmits a signal to the slave device.

In addition, a computer-readable recording medium having a management program recorded thereon also belongs to the technical scope of the present invention, the management program causes a computer to function as the management device and causes the computer to function as the transmission delay time prediction unit, the transmission delay time measurement unit, and the transmission delay time setting unit.

Advantageous Effects of Invention

According to the present invention, it is possible to provide a management device that can flexibly set a task cycle of a master device.

Figure 9:
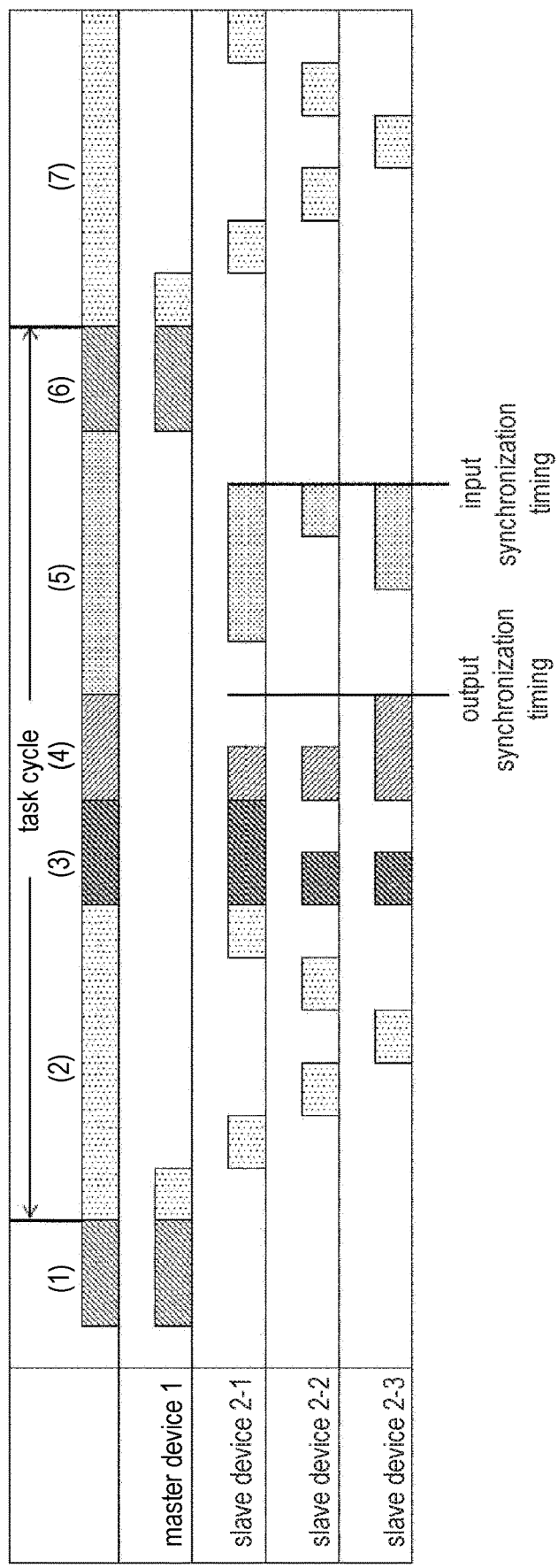
FIG. 9 is a diagram schematically showing processing for achieving synchronization between slave devices of the industrial network shown in FIG. 8 by using the related art.
Figure 10:
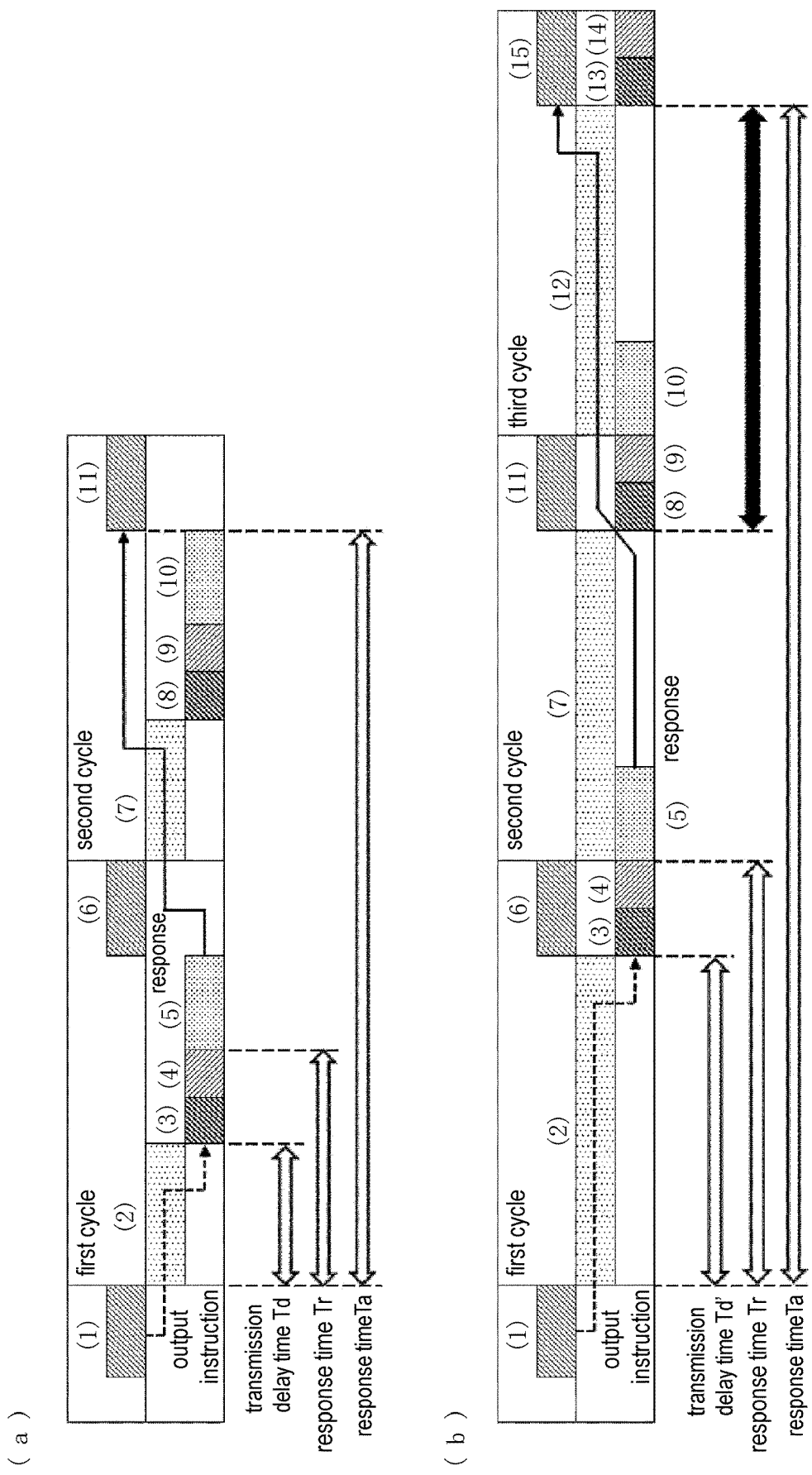

(a) of FIG. 10 is a diagram further schematically showing the processing shown in FIG. 9, and (b) of FIG. 10 is a diagram schematically showing a flow of an output instruction given from a master device to a slave device in a case where an actual transmission delay time is longer than a theoretical transmission delay time.

DESCRIPTION OF EMBODIMENTS

Hereinafter, an embodiment of the present in will be described with reference to the accompanying drawings. In the following embodiment, a management device in a network system conforming to the standard of Ethernet for Control Automation Technology (EtherCAT: registered trademark) will be described, but a subject of the present invention is not limited thereto. The present invention can be applied to a network system including one or more nodes.

Figure 1:
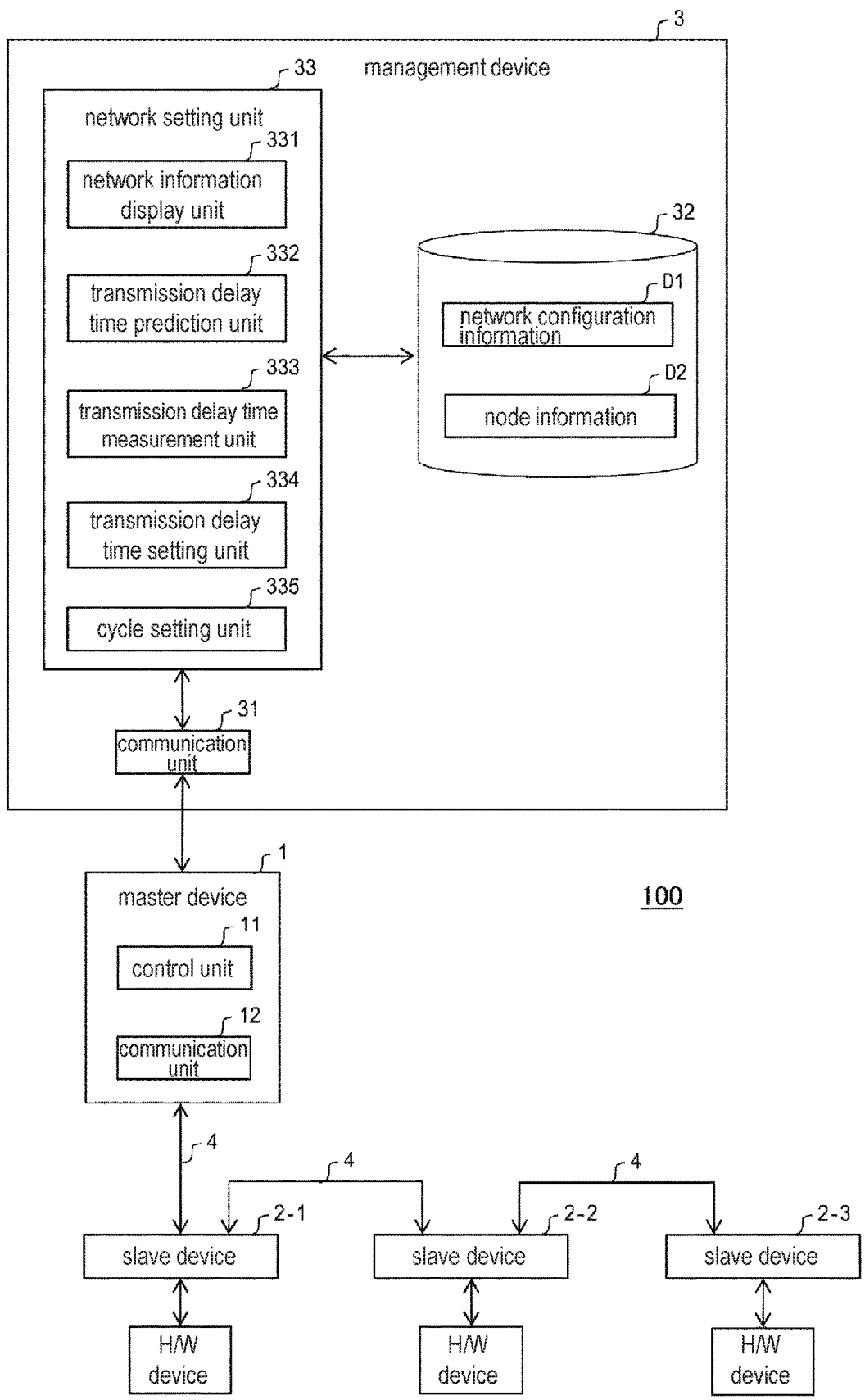
FIG. 1 is a block diagram showing an industrial network according to an embodiment of the present invention, and a configuration of a management device that manages the industrial network.
Figure 8:
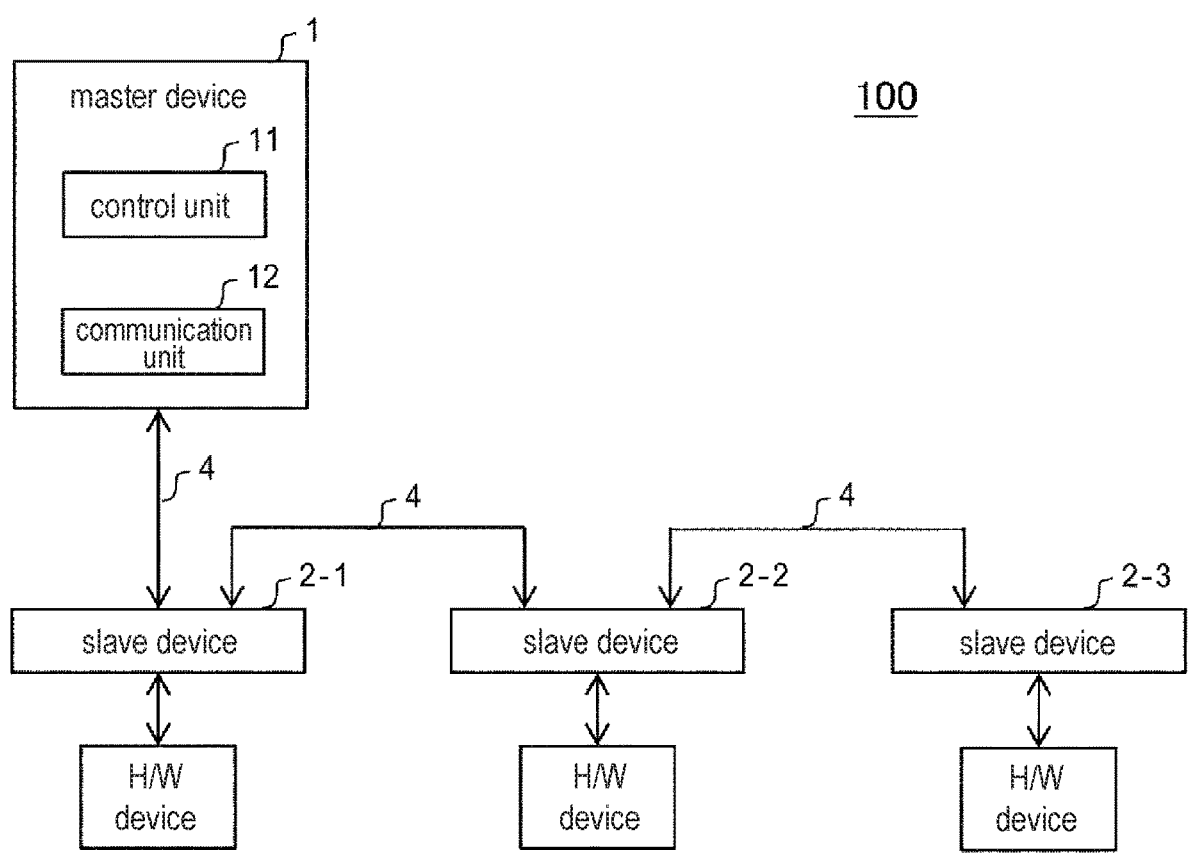
FIG. 8 is a block diagram showing a schematic configuration of a general industrial network.

FIG. 1 is a block diagram showing an industrial network 100 according to an embodiment of the present invention, and a configuration of a management device 3 that manages the industrial network. The industrial network 100 is similar to that shown in FIG. 8, and includes a master device 1 and slave devices 2-1 to connected to the master device 1. The master device 1 and the slave device 2-1 are connected to each other through a cable 4 suitable for EtherCAT communication, and the slave devices 2-1 to 2-3 are connected to each other through a cable 4 suitable for EtherCAT communication. The master device 1 and the management device 3 are connected to each other by Ethernet (registered trademark) communication or USB communication in a wired or wireless manner.

Hereinafter, the slave devices 2-1 to 2-3 may be simply referred to as a slave device 2. In addition, the master device 1 and the slave device 2 may be referred to as a node. In the present embodiment, for simplification of description, three slave devices 2 are provided, but the number of slave devices 2 that can be connected to the master device 1 and a topology thereof are not particularly limited. In the present embodiment, a maximum of 512 slave devices 2 can be connected to one master device 1, and any topology such as a series shape, a ring shape, a tree shape, or a star shape can be applied in accordance with circumstances of association or ng between the slave devices 2.

The master device 1 is a device that intensively manages the slave devices 2 and is constituted by, for example, a Programmable Logic Controller (PLC). The master device 1 controls the slave device 2 by transmitting a control command for performing sequence control to the slave device 2 and monitors the state of the slave device 2 by receiving various data from the slave device 2.

The slave device 2 is a device that performs data collecting and control of a production facility, and performs an operation of controlling the production facility based on a control command received from the master device 1 and processing for writing and returning the received control command. Examples of the slave device 2 include a slave terminal, an NX unit, a CJ unit, an IO-Link device, a power supply unit, a motor unit, a counter unit, an image unit, a communication unit, an I/O unit, and the like. The slave device 2 is appropriately connected to an H/W device which is a production facility in a wired or wireless manner. Examples of the H/W device include an input device such as a sensor, a push button, or a limit switch, and an output device such as a lamp.

(Management Device)

The management device 3 is a computer that manages the industrial network 100 and can be constituted by, for example, a general-purpose personal computer. The management device 3 includes, for example, a central processing unit (CPU), a main storage device (memory), an auxiliary storage device (a hard disk, an SSD, and the like), a display device, and an input device(a keyboard, a mouse, and the like) as a hardware configuration.

In addition, the management device 3 includes a communication unit 31, a storage unit 32, and a network setting unit 33 as functional blocks.

The communication unit 31 is a communication unit for performing communication between the management device 3 and the master device 1.

Network configuration information D1 and node information D2 are stored in the storage unit 32. The network configuration information D1 is a project file indicating a network configuration of a design which is created by a user. The node information D2 s information indicating specific parameters of modes of the master device 1 and the slave devices 2. The time of transmission reception buffering the communication unit 12 of the master device 1, the time at which a data frame is transmitted in the slave device 2, and the like are included in the node information D2.

The network setting unit 33 is a functional block that sets various parameters related to the industrial network 100 and is realized by executing a management program (not shown) stored in the storage unit 32 by the CPU. The management program may be recorded in a non-transitory computer-readable recording medium such as a CD-ROM, or the management program may be installed in the management device 3 by causing the management device 3 to read the recording medium. Alternatively, a code of the management program may be downloaded in the management device 3 through a communication network such as the Internet.

In the present embodiment, the network setting unit 33 mainly has a function of setting a task cycle in which the master device 1 transmits a signal to the slave device 2. In order to realize this function, the network setting unit 33 includes a network information display unit 331, a transmission delay time prediction unit 332, a transmission delay time measurement unit 333, a transmission delay time setting 334, and a cycle setting unit 335.

The network information display unit 331 is a functional block that displays a network configuration diagram showing a connection relationship between the master device 1 and the slave devices 2 and node information of the master device 1 and the slave devices 2. A user starts up the management program to perform a predetermined operation, and thus the network information display unit 331 displays the network configuration diagram shown in FIG. 2 with reference to the network configuration information D1.

In the network configuration diagram, a connection relationship between the master device 1 and the slave devices 2 is graphically shown. Further, in the network configuration diagram, when an icon is selected, the network information display unit 331 displays node information corresponding to the selected icon.

Figure 2:
FIG. 2 shows a network configuration diagram and an example of node information.

In FIG. 2, an icon corresponding to the master device 1 is selected, and node information (property) of the master device 1 is displayed in a region on the right of the network configuration diagram.

In the node information of the master device 1, a "PDO communication cycle" is equivalent to a task cycle in which the master device 1 transmits a signal to the slave device 2. Meanwhile, the "PDO communication", which is a type of EtherCAT communication, is communication that use Process Data Objects (PDO) performing real-time information exchange at a fixed cycle and is also referred to as "process data communication".

Further, in the node information of the master device 1, a transmission delay time for cycle setting for setting a task cycle can be set. When an "editing of setting" button B1 is pressed, the transmission delay time prediction unit 332 shown in FIG. 4 predicts a transmission delay time from when the master device 1 starts transmitting data to when the data returns to the master device 1 via all of the slave devices 2, on the basis of the network configuration information D1 and the node information D2.

The transmission delay time is calculated as follows.

Transmission delay time=[communication unit processing time of the roaster device 1]+[network round (I/O exchange) time]+[margin (constant)]

The communication unit processing time of the master device 1 is a period of time required for transmission reception buffering of the communication unit 12 and depends on the capacity transmitted and received data. Specifically, the communication unit processing time is calculated by the following calculation expression.

Communication unit processing time=[transmission and reception processing time per byte of communication data]×[communication data size]

Transmission and reception processing time per byte of communication data: constant Communication data size: acquired from the network configuration information D1

The network round (I/O exchange) is a period of time required for transmitted data to make the round of all of the slave devices 2 and return to the master device 1, and depends on the number of slave devices 2 and a distance of a network. The network round (I/O exchange) time is calculated by the following calculation expression.

Network round (I/O exchange) time=([delay time per slave device]×[the number of slave devices])+ ([delay time per meter of cable]×[cable length])

Delay time per slave device: constant

The number of slave devices: acquired from network configuration information D1

Delay time per meter of cable: constant

Cable length: acquired from network configuration information D1

Figure 3:
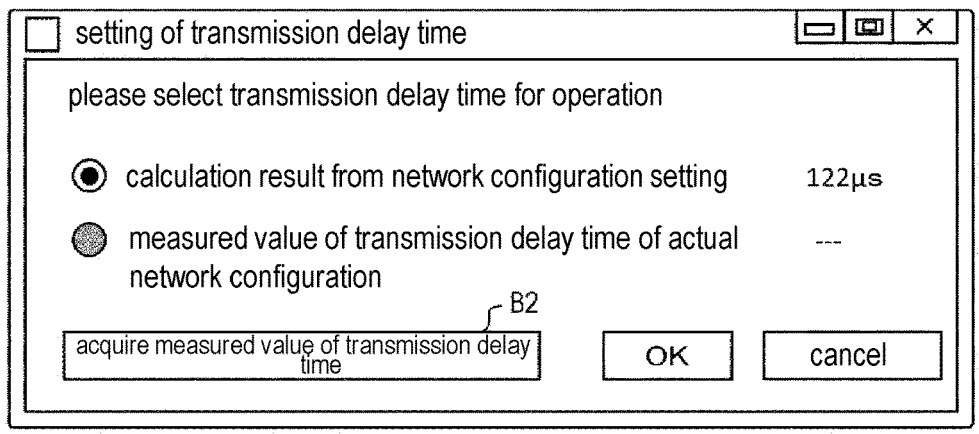
FIG. 3 shows an example of a dialogue for presenting a predicted value of a transmission delay time to a user.

When a transmission delay time is predicted in this manner, a dialogue shown in FIG. 3 is displayed, and a predicted value of the transmission delay time (a calculation result obtained from network configuration setting) is presented to a user.

Further, in the present embodiment, the actual transmission delay tithe can be measured in the industrial network 100 by the transmission delay time measurement unit 333 shown in FIG. 1.

Figure 4:
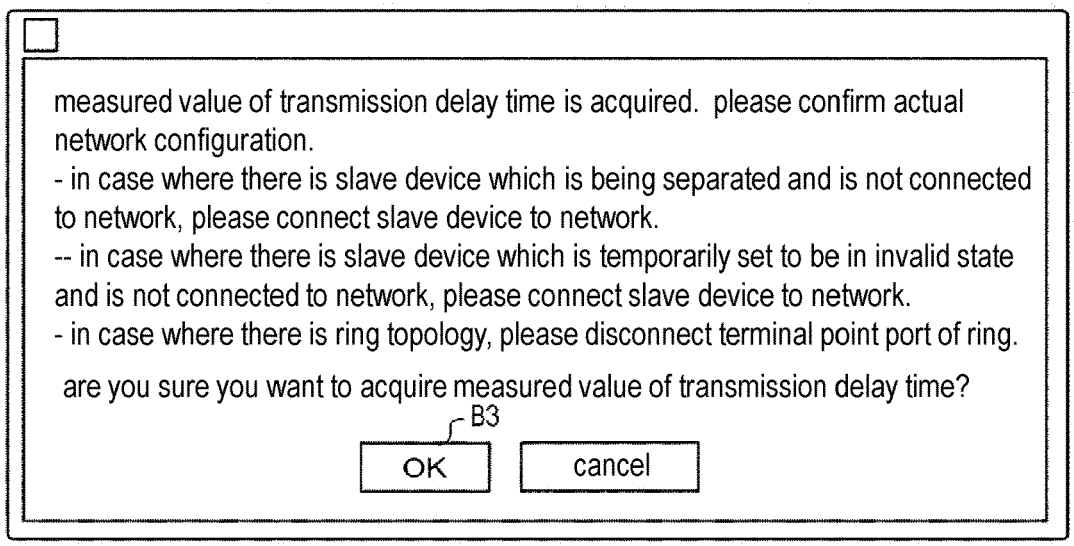
FIG. 4 shows an example of a message box for prompting a user to confirm an actual network configuration.

In the dialogue shown in FIG. 3, when an "acquire measured value of transmission delay time" button B2 is pressed, a message box for prompting a user to confirm an actual network configuration is displayed as shown in FIG. 4. When an OK button B3 is pressed in the message box, the transmission delay time measurement 333 instructs the master device 1. to perform the measurement of a transmission delay time. For example, a mechanism for correcting a distributed clock can be used for the measurement of the transmission delay time. Specifically, a transmission delay time is measured as follows.

1. The master device 1 transmits broadcast write to a port.
2. Each of the slave devices 2 individually stores the time of its local clock when a first bit of the Ethernet (registered trademark) preamble of a frame is received.
3. The master device 1 reads all time stamps and calculates a delay tithe for topology.

When the master device 1 measures a transmission delay time in this manner, the master device returns a measured value to the management device 3. Thereby, the transmission delay time setting unit 334 shown in FIG. 1 presents a predicted value and the measured value of the transmission delay time to a user to set a transmission delay time for cycle setting for setting a task cycle at which the master device 1 transmits a signal to the slave device 2, in the present embodiment, the transmission delay time setting unit 334 displays a dialogue shown in FIG. 5 to present a measured value of a transmission delay time to a user together with a predicted value of the transmission delay time. In this dialogue, radio buttons are associated with the predicted value and the measured value of the transmission delay time, so that the user can select any one of the predicted value and the measured value of the transmission delay time as a transmission delay time for cycle setting for setting a task cycle using the radio buttons, The transmission delay time setting unit 334 sets a transmission delay time for cycle setting in response to a user's selection operation.

Figure 5:
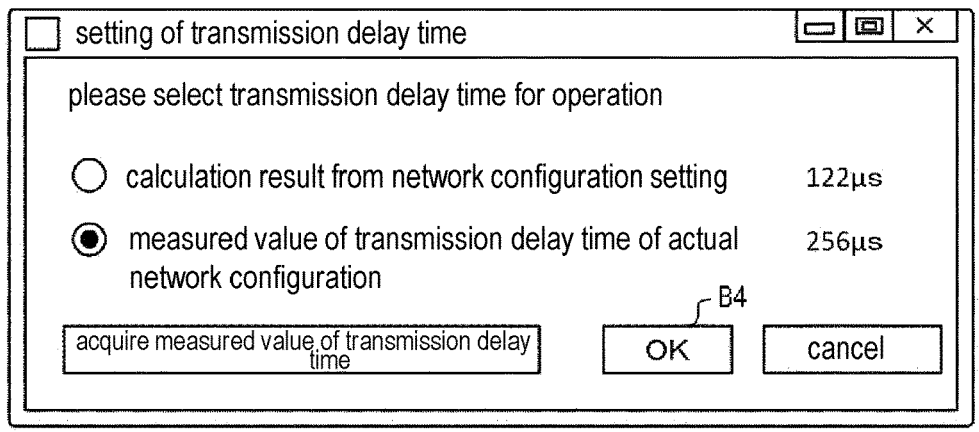
FIG. 5 shows an example of a dialogue for presenting a predicted value and a measured value of a transmission delay time to a user.
Figure 6:
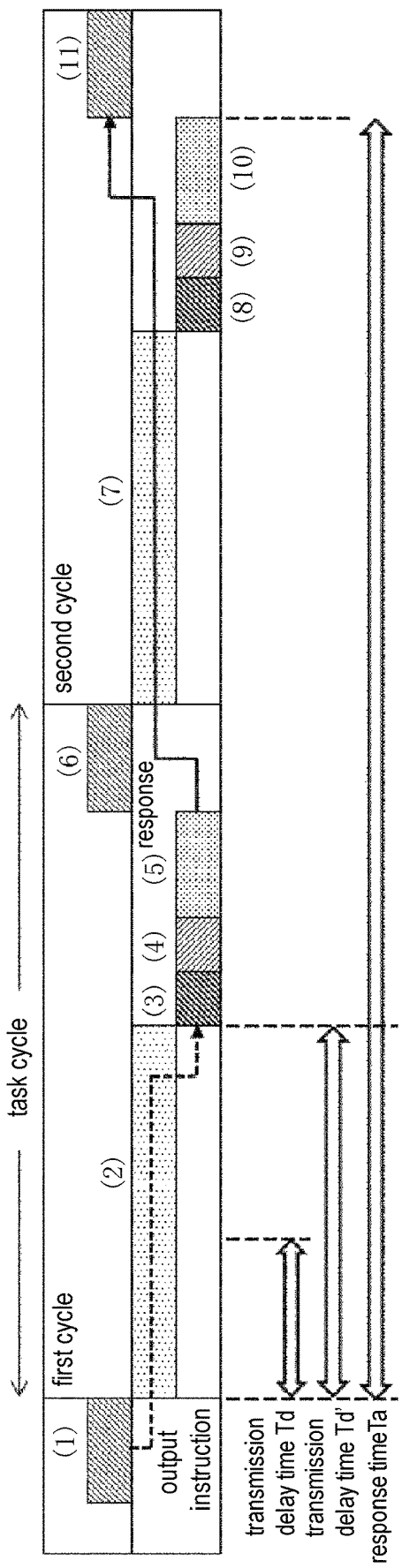
FIG. 6 is a diagram schematically showing a flow of an output instruction given from a master device to a slave device in a case where a task cycle is corrected.

The cycle setting unit 335 shown in FIG. 1 sets a task cycle on the basis of the transmission delay time for cycle setting which is set by the transmission delay time setting unit 334. As shown in FIG. 5, when an OK button B4 is pressed in a state where the radio button corresponding to the measured value of the transmission delay time is selected, the cycle setting unit 335 sets a task cycle on the basis of the measured value of the transmission delay time. For example, as shown in FIG. 6, in a case where a measured transmission delay time Td' is longer than a predicted transmission delay time Td, a task cycle is corrected to such an extent that a timing at which the master device 1 obtains a response to an output instruction is not delayed by one cycle. Thereby, the user can avoid a situation where the slave device 2 does not operate as expected.

Meanwhile, in FIG. 6, the application execution (6) is started after the input latch (5) is completed, but the application execution (6) may be started before the input latch (5) is completed as long as the state value latched in the input latch (5) can be added to a data frame in the network transmission (7).

In a case where the task cycle which is set on the basis of the measured value of the transmission delay time is too long from the viewpoint of practicality, the user can also select the predicted value of the transmission delay time as a transmission delay time for cycle setting in the dialog shown in FIG. 5. In this case, the user can take measures such as reducing the actual transmission delay time by the tuning of a node, the exchanging of a wiring, or the like so that a timing at which the master device 1 obtains a response to an output instruction is not delayed by one cycle. Meanwhile, also in a case where the measured value of the transmission delay time is shorter than the predicted value of the transmission delay time, it is preferable to select the predicted value of the transmission delay time as a transmission delay time for cycle setting.

Further, in a case where it is difficult to make the actual transmission delay time match the predicted value by the tuning of a node or the like, a numerical value input column for a transmission delay time may be provided in the dialogue shown in FIG. 5, and a user may be able to select any time as a transmission delay time for cycle setting.

Thereby, the user can set a task cycle as short as possible by selecting a transmission delay time which is actually expected to be reduced by tuning or the like.

As described above, the management device 3 according to the present embodiment can flexibly set a task cycle of the master device 1 on the basis of a predicted value and a measured value of a transmission delay time.

(Management Method)

Figure 7:
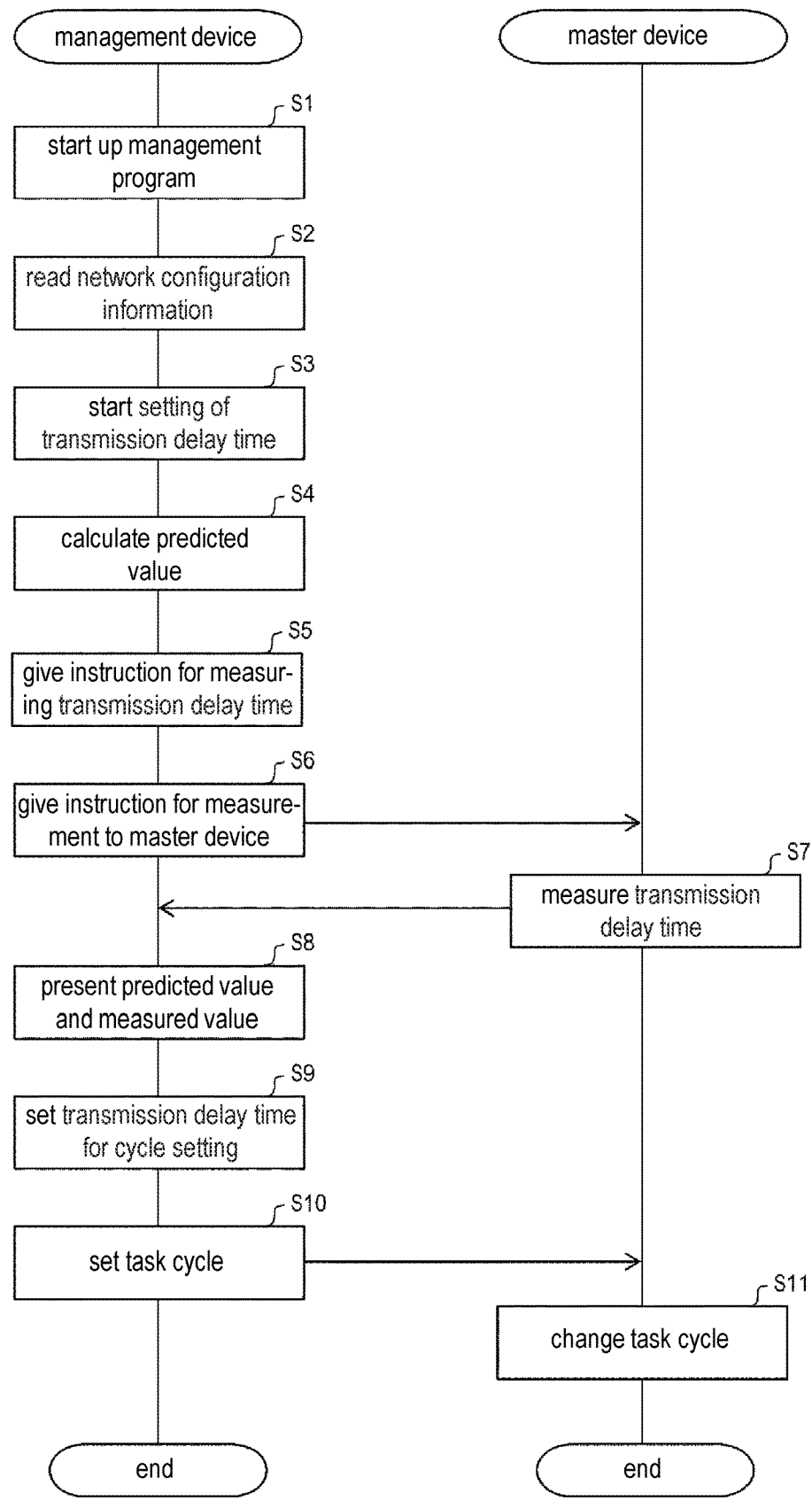
FIG. 7 is a flowchart showing a flow of processing in a management method for managing a network including a master device and slave devices.

FIG. 7 is a flowchart showing a flow of processing in a management method for managing a network including the master device 1 and the slave devices 2. In the drawing, a processing procedure in the management device 3 and the master device 1 is shown.

First, when a user starts up a management program in the management device 3, the network setting unit 33 is started up (S1). Subsequently, the user performs a predetermined operation, and thus the network information display unit 331 reads network configuration information D1 and node information D2 stored in the storage unit 32 and displays the network configuration diagram shown in FIG. 2 and node information of a node (master device 1) (step S2).

Subsequently, the user presses down the "editing of setting" button B1 shown in FIG. 2, the setting of a transmission delay time is started (step S3). First, the transmission delay time prediction unit 332 predicts a transmission delay time on the basis of the network configuration information D1 and the node information D2 (step S4, a transmission delay time prediction step), and the dialogue shown in FIG. 3 is displayed. In this dialogue, when the user presses the "acquire measured value of transmission delay time" button B2 to instruct the measurement of a transmission delay time (step S5), the transmission delay time measurement unit 333 instructs the master device 1 to perform the measurement of a transmission delay time (step S6). Thus, the master device 1 measures a transmission delay time in the industrial network 100 (step S7, a transmission delay time measurement step), and the master device 1 returns a measured value to the management device 3.

Subsequently, the transmission delay tithe setting unit 334 of the management device 3 displays the dialogue shown in FIG. 5 to present the predicted value and the measured value of the transmission delay tithe to the user (step S8). The transmission delay time setting unit 334 sets a transmission delay time for cycle setting in response to the user's selection operation in the dialogue (step S9, a transmission delay time setting step). In this case, the user can select any one of the predicted value and the measured value as a transmission delay time for cycle setting.

Subsequently, the cycle setting unit 335 sets a task cycle on the basis of the set transmission delay time for cycle setting (step S10, a cycle setting step). In a case where the set new task cycle is different from the former task cycle, the management device 3 transmits the new task cycle to the master device 1, and thus the master device 1 changes a task cycle (step S11).

(Additional Notes)

While the embodiment of the present invention has been described, the present invention is not limited to the above-described embodiment, and various changes can be made without departing from the spirit. For example, a form obtained by appropriately combining the technical means disclosed in the above-described embodiment also belongs to the technical scope of the present invention.

The invention claimed is:

1. A management device that manages a network including a master device and slave devices connected to the master device, the management device comprising:

a transmission delay time prediction unit that calculates a theoretical transmission delay time from when the master device starts transmitting data to when the data returns to the master device via all of the slave devices, on the basis of configuration information of the network and node information indicating specific parameters of the master device and the slave devices;

a cycle setting unit for setting a task cycle;

a transmission delay time measurement unit that measures a transmission delay time in the network; and a transmission delay time setting unit that presents a calculated value from the theoretical transmission delay time calculated by the transmission delay time prediction unit and a measured value from the transmission delay time obtained by the transmission delay time measurement unit to a user to set a new transmission delay time for setting the task cycle at which the master device transmits a signal to the slave device in response to the user's selection operation, wherein in response to the transmission delay time measured by the transmission delay time measurement unit being longer than the theoretical transmission delay time calculated by the theoretical transmission delay time unit, the cycle setting unit is configured to correct the task cycle in a way that after an output instruction is transmitted from the master device, a response of the output instruction from all the slave devices is transmitted during the task cycle and is received by the management device in another task cycle which is right after the task cycle.

2. The management device according to claim 1, wherein the transmission delay time setting unit sets either the calculated value or the measured value as the new transmission delay time for cycle setting.

3. A computer-readable recording medium having a management program recorded thereon, wherein the management program causes a computer to function as the management device according to claim 1, and the management program causes the computer to function as the transmission delay time prediction unit, the transmission delay time measurement unit, the cycle setting unit, and the transmission delay time setting unit.

4. A management method for managing a network including a master device and slave devices connected to the master device, the management method comprising:

a transmission delay time prediction step of calculating a theoretical transmission delay time from when the master device starts transmitting data to when the data returns to the master device via all of the slave devices, on the basis of configuration information of the network and node information indicating specific parameters of the master device and the slave devices;

a cycle setting step for setting a task cycle;

a transmission delay time measurement step of measuring a transmission delay time in the network; and a transmission delay time setting step of presenting a calculated value from the theoretical transmission delay time calculated in the transmission delay time prediction step and a measured value from the transmission delay time obtained in the transmission delay time measurement step to a user to set a new transmission delay time for setting the task cycle at which the master device transmits a signal to the slave device in response to the user's selection operation, wherein in response to the transmission delay time measured by the transmission delay time measurement step being longer than the theoretical transmission delay time calculated by the theoretical transmission delay time step, another cycle setting step is performed to correct the task cycle in a way that after an output instruction is transmitted from the master device, a response of the output instruction from all the slave devices is transmitted during the task cycle and is received by the management device in another task cycle which is right after the task cycle.

* * * * *